April 10, 1962 J. S. FERM 3,029,057
RESISTOR MOUNTING CLAMP
Filed Oct. 3, 1958
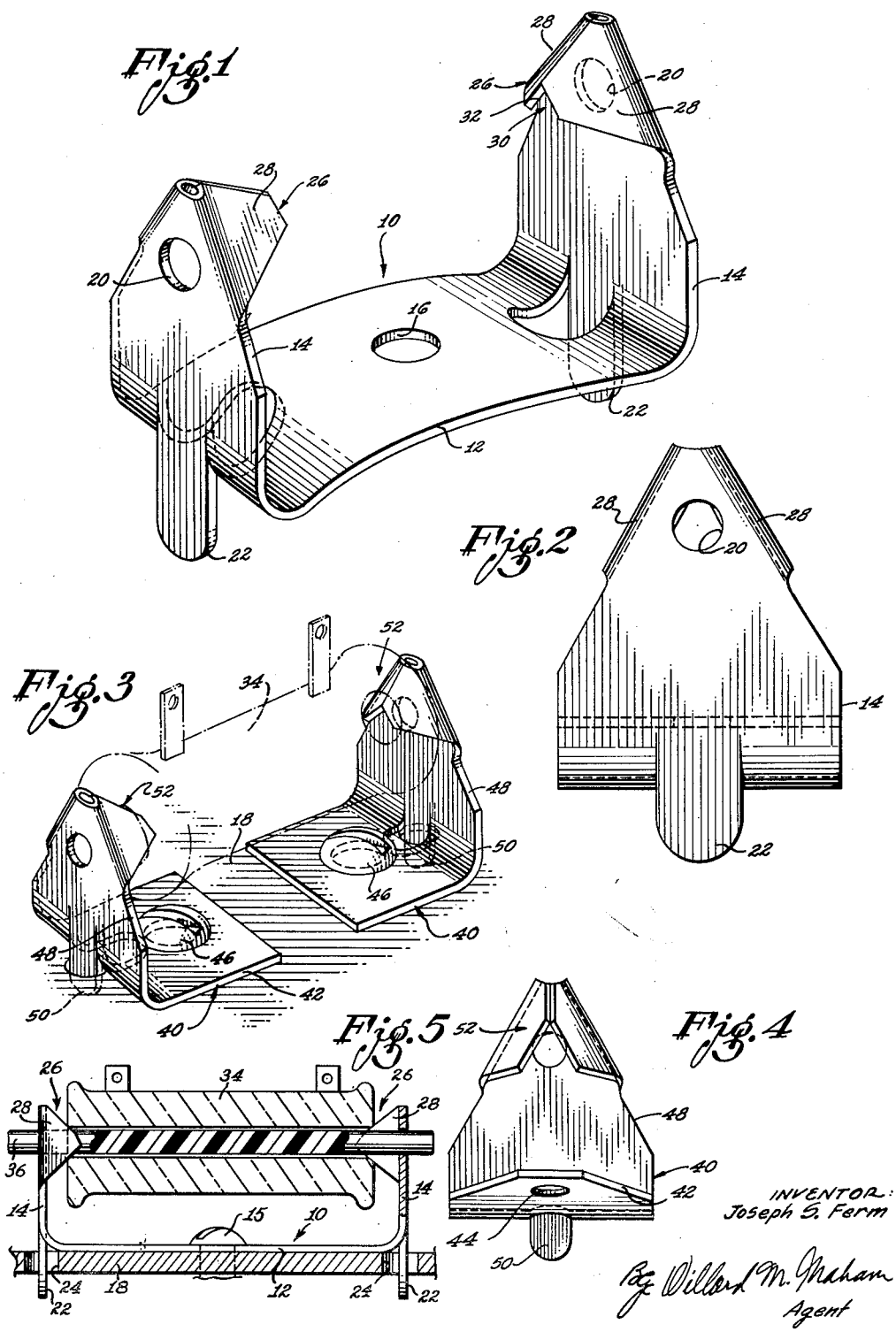
INVENTOR:
Joseph S. Ferm
By Willard M. Graham
Agent United States Patent Office 3,029,057
Patented Apr. 10, 1962

3,029,057
RESISTOR MOUNTING CLAMP
Joseph S. Ferm, Huntington Beach, Calif., assignor to Northrop Corporation, a corporation of California
Filed Oct. 3, 1958, Ser. No. 765,243
3 Claims. (Cl. 248—316)

This invention has to do with electronics and more particularly with a clip or clamp for holding and mounting hollow cylindrical objects such as certain types of resistors and the like.

Heretofore, equipment for holding and supporting electrical as well as electronic components such as hollow cylindrical resistors have been difficult to assemble, relatively massive, expensive, and in the main not particularly suitable. Various factors, such as mass and rigidity, worked to a severe disadvantage. The mass became an undesirable factor when space was a premium. Rigidity became a factor when shock and vibration had to be given serious consideration. Cost is always a factor.

An object of this invention is to provide a clip or clamp for a hollow cylindrical object that is relatively economical to manufacture, has resilience in operation, is relatively easy to handle and assemble, is relatively small in size, and is versatile with regard to holding and supporting various size objects.

Another object of this invention is to provide a clip or clamp, for hollow cylindrical objects, that is easily mounted and retained on an electronic chassis or the like.

Briefly the invention broadly comprises a U-shaped body that is fastened to a chassis. The body includes a pair of opposed legs, integral with the bight of the body, each having inwardly projecting tangs or holding members. The hollow cylindrical object, to be held, is placed between the legs and tangs. The tangs are received in the open ends of the object. Downwardly extending tabs on the body are received in openings in the chassis. The tabs assist in holding the body in the selected position and prevent rotation thereof.

FIGURE 1 is a perspective view illustrating and having embodied therein the present invention.

FIGURE 2 is an end view of the device illustrated in FIGURE 1.

FIGURE 3 is a perspective view illustrating and having embodied therein another form of the invention.

FIGURE 4 is a perspective end view of the device illustrated in FIGURE 3.

FIGURE 5 is a fragmentary, cross-sectional view illustrating and having embodied therein still another form of the invention.

Referring to the drawings for a more detailed description of the present invention 10 broadly designates an elongated U-shaped body. An arcuately or upwardly bowed bight 12 spans the distance between and is integral with a pair of spaced apart and identical legs 14. The end view, FIGURE 2, illustrates that each leg is generally triangular shaped. A fastener 15 receiving opening 16 is provided in the bight 12 in order that the clip or clamp may be attached to some form of support such as a chassis 18 or the like. Each leg 14 has, adjacent the apex thereof, an opening 20.

A tab 22, integral with each leg, extends downwardly therefrom as may be seen by referring to FIGURES 1 and 2. Each tab is received in a tab receiving opening 24 that is formed in the chassis or support 18. The function of the tabs is to prevent rotation of the clip or clamp after it has been properly located.

An inwardly extending projection or object receiving member 26 is integral with the apex end of each leg 14. Each projection comprises a pair of truncated triangular tabs 28 that has one side in or near contacting relationship with the corresponding side of the adjacent tab. Due to the fact that each projection 26 is made up of a pair of truncated triangular tabs 28 a triangular gap 30 is provided between the apex ends of each projection. This gap is in linear alignment with the gap in the opposed projection and both openings 20 in each leg. Further, each tab 28 has a knife edge 32 thereon.

Attention is directed to FIGURE 5. It may be seen that the clip of FIGURE 1 is properly mounted and a hollow cylindrical resistor 34 or similar electronic component is supported between the legs 14 by the projections 26. However, the clip of FIGURE 5 is slightly modified to the extent that a rod 36 passes through the openings 20, gaps 30 and resistor 34 in the manner illustrated. The rod provides additional support for the component 34 if it is needed. However, the rod is held in place and removal, due to vibration or the like, is prevented due to the tab knife edges 32. The knife edges on each projection 26 work against each other. In other words, if the rod 36 tends to slide either one way or the other a set of knife edges will engage it and resist further sliding.

The operation of the invention illustrated in FIGURES 1, 2, and 5 is as follows. The body 10 is mounted on a chassis or support 18. The bowed bight 12 is forced flat through the medium of the fastener. This forcing flat of the bight 12 urges the legs 14 inwardly toward each other. The result of urging the legs toward each other reduces the space between the legs and the components 34 must or should be forced into the position illustrated in FIGURE 5. The tension imposed outwardly on the legs by the component results in the component being firmly held in position. If additional support is required for the component 34 the rod 36 is inserted as illustrated in FIGURE 5.

The clip being an integral unit provides a reliable holding device for the component 34. If the mounted unit illustrated in FIGURE 5 is subjected to vibrations equal resonance will occur in all parts of the structure. Each leg will resonate in the same direction as the opposed leg and there will be little danger of the component being shaken loose. The tension created by the legs and component will tend to compensate for forces that may work in opposition to the established tension.

Attention is directed to FIGURES 3 and 4 and a modified form of the invention.

The entire clip is made up of a pair of identical L-shaped bodies 40. Due to the identity of the bodies only one will be described.

One leg 42 of the body has an opening 44 therein to receive a fastener 46. It may be readily determined that the angle established between leg 42 and leg 48 is acute. Therefore when the leg 42 is fastened to the chassis 18, leg 48 is inclined toward the opposed mounted body 40. The body 40 has a tab 50 thereon that is identical to tab 22.

Additionally, each leg 48 has an opening therein identical to opening 20 and a projection 52 integral therewith. Projection 52 is identical to projection 26.

The operation of the invention illustrated in FIGURES 3 and 4 is as follows: The pair of bodies 40 are suitably mounted to the chassis 18 through the medium of the fasteners 46. The space between the projections 52 is less than the length of the component 34. As a result when the component is mounted as illustrated in FIGURE 3 the inclined legs 48 in combination with the component will provide sufficient tension to hold the component against such forces as may be induced to remove it.

If desired a soft plastic rod 36 may again be used in an identical manner as is illustrated in FIGURE 5.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A mounting clamp which comprises: a U-shaped body the bight of which is upwardly bowed between a vertically extending leg at each end thereof, a fastener opening through said bight, and a pair of triangular tabs projecting inwardly above said bight from the upper end of each of said legs, each said pair of tabs having one side of one tab substantially adjacent to a corresponding side of the other tab to form an open-center tapered pyramid-like projection.

2. The combination of a clamp and tubular article mounted therein which comprises: a U-shaped body, a vertically extending leg at each end of the bight of said body, a tubular article mounted above said bight between said legs with the opening at each end of article positioned adjacent the upper end of one of said legs, a triangular tab tapering inwardly from the upper end of each of said legs and extending into the openings at each end of said article, the bases of said triangular tabs being wider than said article openings so that the outer sides of said tabs are forced against said article immediately adjacent said openings, the bight of said body being upwardly bowed between said legs and having a fastener opening therethrough so that when said body is fastened to a support thereby, said bowed bight is compressed downwardly to urge said legs inwardly toward each other forcing said tabs into firmer contact in the said article openings.

3. The combination of a clamp and tubular article mounted therein which comprises: a U-shaped body, a vertically extending leg at each end of the bight of said body, a tubular article mounted above said bight between said legs with a round opening at each end of article positioned adjacent the upper end of a leg at each end of said bight, a tapered tab projecting inwardly from the upper end of each of said legs and extending into the openings at each end of said article, an aperture through each of said legs behind said tabs and aligned with the openings and central passage of said tubular article, a rod extended through said aperture and the central passage of said article with an inner edge of said tab biased against said rod, the bight of said body being upwardly bowed between said legs and having a fastener opening therethrough so that when said body is fastened to a support thereby, said bowed bight is compressed, urging said legs inwardly toward each other forcing said tabs into firmer contact against the periphery of the said article openings, the inner ends of said tabs being forced into firm contact with the surface of said rod to hold said rod securely in place.

References Cited in the file of this patent

UNITED STATES PATENTS

| | | |
|---|---|---|
| 2,494,881 | Kost | Jan. 17, 1950 |
| 2,541,828 | Peck | Feb. 13, 1951 |
| 2,656,577 | Carbary | Oct. 27, 1953 |
| 2,697,577 | Wolf | Dec. 21, 1954 |
| 2,873,082 | Gillespie | Feb. 10, 1959 |
| 2,878,301 | Dierstein | Mar. 17, 1959 |
| 2,909,354 | Bingham | Oct. 20, 1959 |

FOREIGN PATENTS

| | | |
|---|---|---|
| 549,425 | Canada | Nov. 26, 1957 |